(12) United States Patent
Akkinepally et al.

(10) Patent No.: US 11,571,876 B2
(45) Date of Patent: Feb. 7, 2023

(54) DIELECTRIC FILM WITH PRESSURE SENSITIVE MICROCAPSULES OF ADHESION PROMOTER

(71) Applicant: Intel Corporation, Santa Clara, CA (US)

(72) Inventors: Praneeth Akkinepally, Chandler, AZ (US); Frank Truong, Gilbert, AZ (US); Dilan Seneviratne, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 16/480,593

(22) PCT Filed: Mar. 17, 2017

(86) PCT No.: PCT/US2017/022898
§ 371 (c)(1),
(2) Date: Jul. 24, 2019

(87) PCT Pub. No.: WO2018/169543
PCT Pub. Date: Sep. 20, 2018

(65) Prior Publication Data
US 2019/0389179 A1    Dec. 26, 2019

(51) Int. Cl.
*B32B 27/36* (2006.01)
*B32B 7/12* (2006.01)
(Continued)

(52) U.S. Cl.
CPC ............... *B32B 7/12* (2013.01); *B32B 15/20* (2013.01); *B32B 27/36* (2013.01); *C08K 5/17* (2013.01);
(Continued)

(58) Field of Classification Search
None
See application file for complete search history.

(56) References Cited

U.S. PATENT DOCUMENTS

| 5,874,770 A | 2/1999 | Saia et al. |
| 7,229,911 B2 | 6/2007 | Rajagopalan et al. |

(Continued)

FOREIGN PATENT DOCUMENTS

| JP | 63275688 A | * 11/1988 | ............ B01J 13/025 |
| KR | 10-2006-0102377 | 9/2006 | |

(Continued)

OTHER PUBLICATIONS

Derwent abstract for JP 63275688 (Year: 1988).*
(Continued)

*Primary Examiner* — Frank D Ducheneaux
(74) *Attorney, Agent, or Firm* — Schwabe, Williamson & Wyatt, P.C.

(57) ABSTRACT

Embodiments are generally directed to dielectric film with pressure sensitive microcapsules of adhesion promoter. An embodiment of an apparatus includes a dielectric film, the dielectric film including a dielectric material layer; a layer of pressure sensitive microcapsules on a first side of the dielectric material layer, the microcapsules including an adhesion promoter; and a cover material on the layer of microcapsules. The pressure sensitive microcapsules are to rupture upon application of a certain rupture pressure.

12 Claims, 7 Drawing Sheets

(51) Int. Cl.
- *B32B 15/20* (2006.01)
- *C09J 7/29* (2018.01)
- *C09J 7/40* (2018.01)
- *C09J 11/00* (2006.01)
- *C08K 5/17* (2006.01)
- *C08K 5/37* (2006.01)
- *C09J 7/25* (2018.01)

(52) U.S. Cl.
CPC ............... *C08K 5/37* (2013.01); *C09J 7/255* (2018.01); *C09J 7/29* (2018.01); *C09J 7/40* (2018.01); *C09J 11/00* (2013.01); *B32B 2250/03* (2013.01); *B32B 2264/102* (2013.01); *B32B 2307/204* (2013.01); *B32B 2309/12* (2013.01); *B32B 2311/12* (2013.01); *B32B 2398/00* (2013.01); *B32B 2457/00* (2013.01); *C09J 2301/122* (2020.08); *C09J 2301/408* (2020.08); *C09J 2301/41* (2020.08); *C09J 2301/412* (2020.08); *C09J 2467/006* (2013.01)

(56) References Cited

U.S. PATENT DOCUMENTS

| | | |
|---|---|---|
| 8,043,976 B2 | 10/2011 | Vrtis et al. |
| 2005/0181598 A1 | 8/2005 | Kailasam |
| 2006/0214204 A1 | 9/2006 | Yoo et al. |

FOREIGN PATENT DOCUMENTS

| | | |
|---|---|---|
| KR | 10-2007-0007937 | 1/2007 |
| KR | 10-2009-0101859 | 9/2009 |

OTHER PUBLICATIONS

Derwent_2_abstract for JP 63275688 (Year: 1988).*
Human translation of JP 63275688 (Year: 1988).*
International Search Report and Written Opinion for International Patent Application No. PCT/US2017/022898, dated Sep. 26, 2019, 6pgs.
International Search Report and Written Opinion for International Patent Application No. PCT/US2017/022898 dated Dec. 14, 2017, 13 pgs.

* cited by examiner

DIELECTRIC FILM WITH PRESSURE SENSITIVE MICROCAPSULES OF ADHESION PROMOTER

CROSS-REFERENCE TO RELATED APPLICATION

This patent application is a U.S. National Phase Application under 35 U.S.C. § 371 of International Application No. PCT/US2017/022898, filed Mar. 17, 2017, entitled "DIELECTRIC FILM WITH PRESSURE SENSITIVE MICROCAPSULES OF ADHESION PROMOTER," which designates the United States of America, the entire disclosure of which is hereby incorporated by reference in its entirety and for all purposes.

TECHNICAL FIELD

Embodiments described herein generally relate to the field of electronic devices and, more particularly, dielectric film with pressure sensitive microcapsules of adhesion promoter.

BACKGROUND

In the fabrication substrates of electronic devices, there is commonly a buildup of several layers of different materials. For example, after applying patterned copper, a dielectric layer may be applied.

However, in order to provide sufficient adhesion between the patterned copper and the dielectric layer, current substrate manufacturing practices commonly include some process for roughening of the copper material to improve adhesion/peel strength between patterned copper and dielectric film. The roughening process is a process for improving mechanical interlocking based adhesion. The roughening process for copper may include chemical or mechanical roughening of the copper surface.

However, the chemical processing of copper surface can create undesirable effects in the materials of the device or system, as well as requiring additional steps in the fabrication process. Further, as devices move towards finer trace lines and line spacing the adverse effects on signal integrity become more significant.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
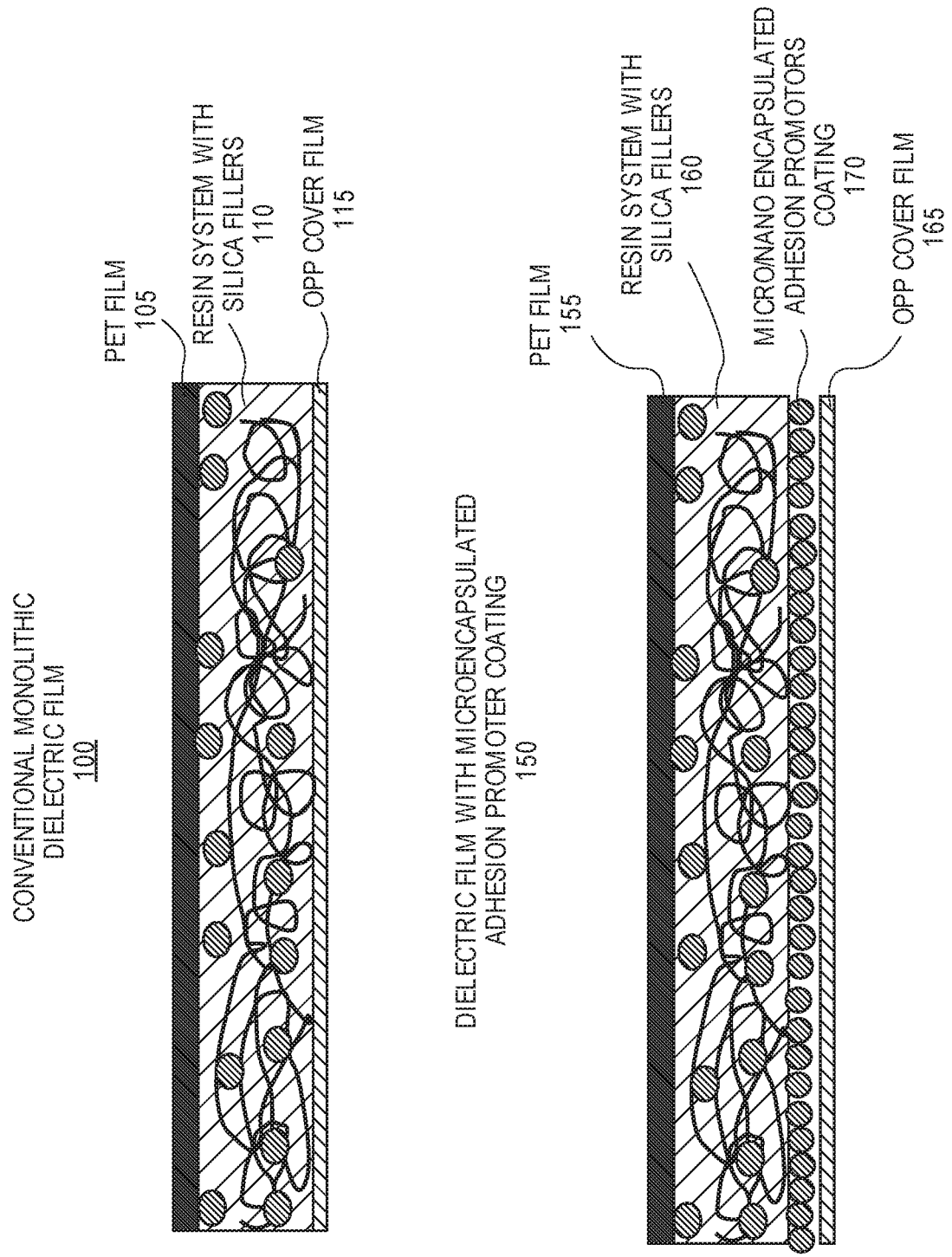
FIG. 1 illustrates a dielectric film with pressure sensitive microcapsules of adhesion promoter according to an embodiment.

Embodiments described herein are generally directed to dielectric film with pressure sensitive microcapsules of adhesion promoter.

For the purposes of this description:

"Microcapsule" refers to pressure sensitive capsule that may contain a material, the microcapsule being designed to burst upon application of a certain amount of pressure or force, wherein the amount of pressure or force may be referred to as the rupture pressure or rupture force for the microcapsule.

In general a maximum size of a microcapsule may be as large as 100 μm (micrometers), but the maximum size for a particular implementation may vary based on the dielectric film thickness or other factors. For example, a microcapsule for a 30 μm film may have a maximum size 5 μm, while a microcapsule for a 300 μm film may have a maximum size of 50 μm.

"Adhesion promoter" or "AP" means a material to promote formation of an adhesive layer between a first material and a second material.

A process for manufacturing a substrate for an electronic system or apparatus commonly utilizes a roughening process for the patterned copper to improve adhesion/peel strength between copper and dielectric film by improving mechanical interlocking based adhesion. Chemical roughening is common, while certain processes may include mechanical roughening of the copper surface.

However, chemical roughening requires a strong chemical reaction, and issues that are faced in the chemical roughening process include the following:

(1) Chemical staining in the chemical roughening process is caused by the drag out of chemistries. In addition to creating a cosmetic issue, the chemical staining can generate a copper oxide layer that can impact the adhesion between the copper and dielectric.

(2) The chemical roughing process requires an additional immediate drying process, the drying being required to prevent oxide layer formation.

(3) To minimize the oxide growth, the process time between dielectric lamination and chemical roughening process is required to be well controlled. Any delay or failure to process in the given queue time will result in yield loss and reliability failure.

(4) If oxide growth is encountered, the chemical roughening process may require modification to provide additional cleaning and drying procedures.

(5) The full chemical roughening process involves significant capital in the tool establishment as well as lot of manpower, time, and other resources to maintain the tool and other auxiliary tools/oxide growth containment methods.

(6) The chemical roughening process control is very critical as it impacts not only roughness but also copper pattern dimensions, which in turn impacts key process parameters such as impedance and resistance. Variation in the chemical roughening process results in a direct impact on the electrical performance of the electronic package.

(7) Chemical roughening requires the application of harsh chemicals, and the use of water for cleaning processes.

In addition to the above described issues that are generally faced in conventional substrate building process, additional process limitations are faced as the substrate process moves towards finer trace lines and spacing between traces. Certain of these limitations are the following:

(1) The chemical roughening/mechanical adhesion for a finer pitch scale may cause significant signal loss (which may be referred to as an insertion loss) through the copper traces because of high levels of trace roughness resulting from the roughening process. Further, with the increase in frequency of operation, the skin depth of the signal decreases to the order of copper/conductor roughness, thus resulting in significant insertion loss.

(2) The chemical roughening/mechanical adhesion may result in patterning and electrical yield losses because of resulting faults such as plane shorts.

Thus, the conventional chemical roughening process not only is a cumbersome process, but also has several limitations in practice.

An alternative process to chemical roughening may include the use of external adhesion promoters (AP), such as organic and inorganic adhesives, to assist in the chemical bonding of copper and dielectric while avoiding the damage caused by chemical roughening. However, the common methods of applying a material such as an adhesive promoter involve an additional process step such as spin coating, spray coating, and dip coating. While the use of external adhesion promoters addresses certain concerns faced in the conventional roughening process, the application process still requires additional capital cost, process control, and maintenance. The application process may include an organic treatment, wherein the nano scale treatment can be brittle and may result in trace shorting, or a chemical approach, which adds to complexity, including questions regarding the necessary cure times and potential issues regarding the dispersion of the adhesive during application.

In some embodiments, an apparatus, system, and process provide adhesion promotion between copper and dielectric in substrate fabrication by utilizing pressure sensitive microcapsules of adhesion promoter. A process provides for the application of the adhesion promoter without requiring additional process steps and tools. Further, the application of adhesion promoter using microcapsules provides advantages in controlling the amount of adhesive and the dispersion of the adhesive in application.

FIG. 1 illustrates a dielectric film with pressure sensitive microcapsules of adhesion promoter according to an embodiment. An example of a conventional monolithic dielectric film 100 may include PET (Polyethylene Terephthalate) film 105, a resin system including silica fillers 110, and an OPP (Oriented Polyethylene) cover film 115. However, embodiments are not limited this particular example. Dielectric material may also include, but is not limited to, build up dielectric, solder resist dielectric, mold based dielectric, prepreg dielectric, and other such forms of dielectric.

In some embodiments, a dielectric film 150 includes a microencapsulated adhesion promotor coating. As illustrated, the dielectric film 150 may include PET film 155, the resin system including silica fillers 160, and the OPP cover film 165. In some embodiments, the dielectric film further includes a microencapsulated adhesion promoter film 170. In some embodiments, the dielectric film is a normal film with the addition of a microcapsule coating, wherein the coating may be added using a known process such as spray or slit die coating for the application of a thin coating.

In some embodiments, the dielectric film 150 may be utilized in an apparatus, system, or process by which the pressure sensitive microcapsules of adhesion promoters are implemented on a surface facing patterned copper. Since these microcapsules are pressure sensitive, the capsules will rupture during lamination of the dielectric film and dispense the adhesion promoters that form a chemical bond between the copper and the dielectric.

In some embodiments, the adhesion promoter may include a bi-functional adhesion promoter that includes material to increase adhesion both for copper and for the resin or other dielectric material of the dielectric film. After the microcapsules are ruptured, the bi-functional promoter provides the copper promoter and the dielectric promoter. In some embodiments, the bi-functional material may include additional linking material, i.e., a linking group between the two promoters, such as carbon material to extend the distance between the links.

The implementation of microencapsulated adhesion promotion for the adhesion of copper and dielectric provides advantages over processes for external application of adhesion promoters, wherein the advantages may include the following:

(1) Reduction in process steps: Unlike a process of coating AP layers on copper, which requires a separate process for application of adhesion promoters, the application of pressure sensitive microcapsules of adhesion promoter doesn't require additional processes. The adhesion promoters can be delivered to the copper and dielectric film during the lamination process itself. This process may further assist in avoiding process and equipment differences for enabling AP at multiple substrate manufacturers.

(2) Simplification of process: A process of AP coating would need to be well controlled in order to provide uniform thickness, zero residue, and other factors. The AP coating process for substrate packaging hasn't been fully developed, and hence all the issues associated with this process are not yet known.

In contrast, an embodiment utilizing lamination of dielectric film with encapsulated AP is much simpler as it operates within a common film lamination process. Because the AP will already be encapsulated and coated by a material supplier, concerns regarding of process control and establishment are greatly reduced.

Further, the process of encapsulation and coating is an established process, and is applied in technologies such as pressure sensitive paper manufacturing. The material generation process isn't overly complex for a material supplier either as many material suppliers already manufacture multi-layered dielectric films. The current technology includes the generation of pressure sensitive microcapsules that will rupture upon the application of a selected design force, and thus can be manufactured to rupture upon the pressure that is applied in the lamination of a dielectric film. For example, the pressure commonly applied in lamination conditions is in the range of 0.5-1.0 MPa (mega pascals). However, embodiments are not limited to such a process, and may also include, for example hot press or compression molding like processes in which the pressure may be significantly higher, such as in the range of tens of MPa. In some embodiments, the rupture pressure of a microcapsule is designed for rupture upon application of the appropriate pressure for the particular process applied in the lamination of a dielectric film.

(3) Cost reduction: Known processes of AP coating require capital investment to install a tool to enable AP application, and further require maintenance cost, trained personnel, and other resources that consume not just money but also significant time. In contrast, an embodiment of a process utilizing pressure sensitive microcapsules of adhesion promoter assists in limit the capital cost to the material supplier side, and many film coating suppliers already have capability to produce multilayer coated dry films, which would be amenable to enabling the dielectric film with pressure sensitive microcapsules of adhesion promoter.

(4) Resource reduction: The avoidance of chemical roughening agents may allow for a reduction in the use of water and other resources in the production of electronic devices.

(5) Flexibility: By adding the adhesion promoter through pressure sensitive microcapsules to the buildup material, a modular system is enabled for manufacturers. The process is a "plug and play" type of system that may be used for materials across a range of vendors or different product lines within a vendor's catalogue.

Figure 2:
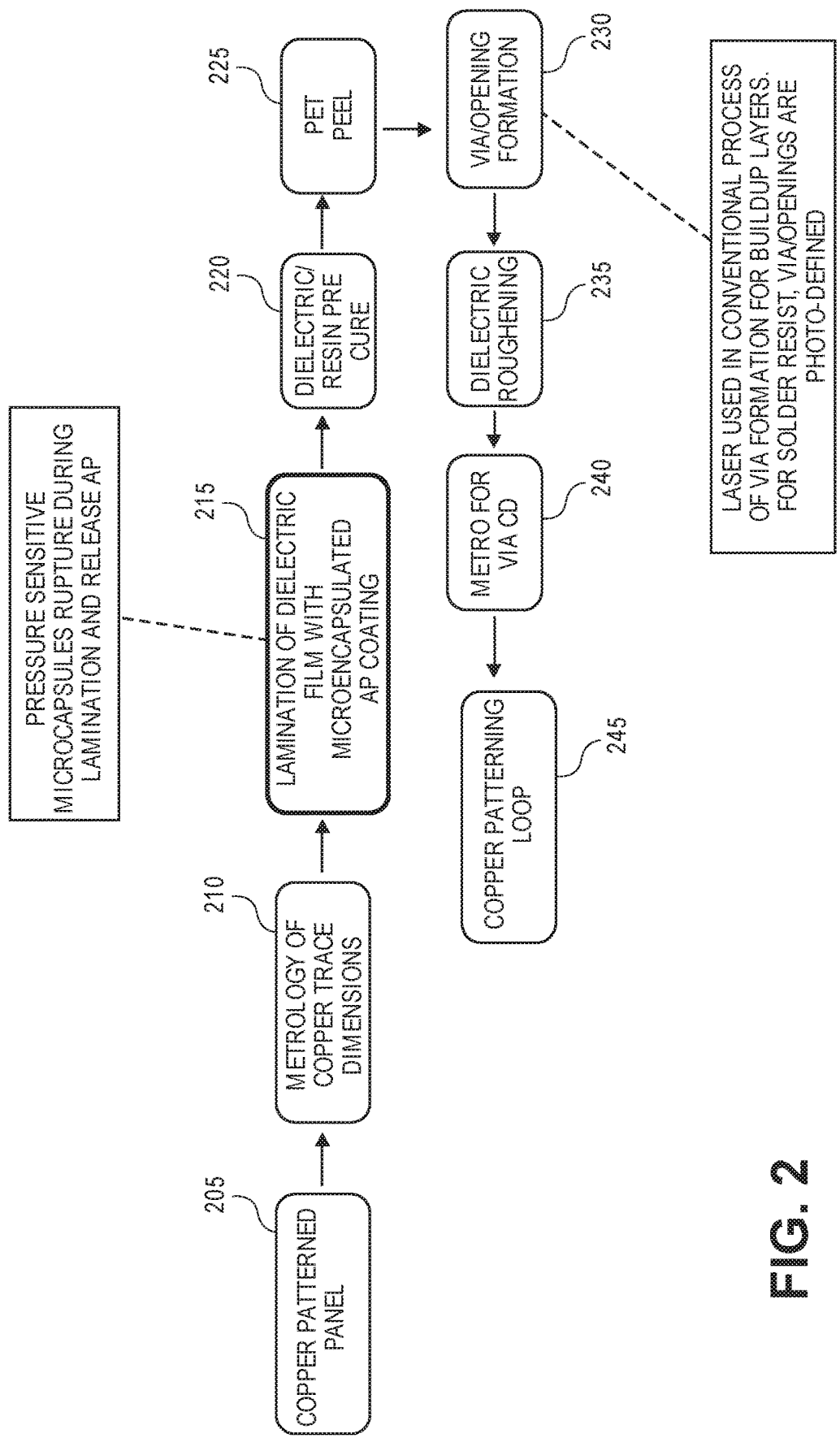
FIG. 2 illustrates a process for fabrication of an apparatus or system including application of microencapsulated adhesion promoter according to an embodiment.

FIG. 2 illustrates a process for fabrication of an apparatus or system, such as an electronic package, including application of microencapsulated adhesion promoter according to an embodiment. In some embodiments, a process includes the following:

205: Patterning of copper for panel.

210: Metrology of the copper trace dimension, measuring the panel being measured for trace dimensions.

Figure 5:
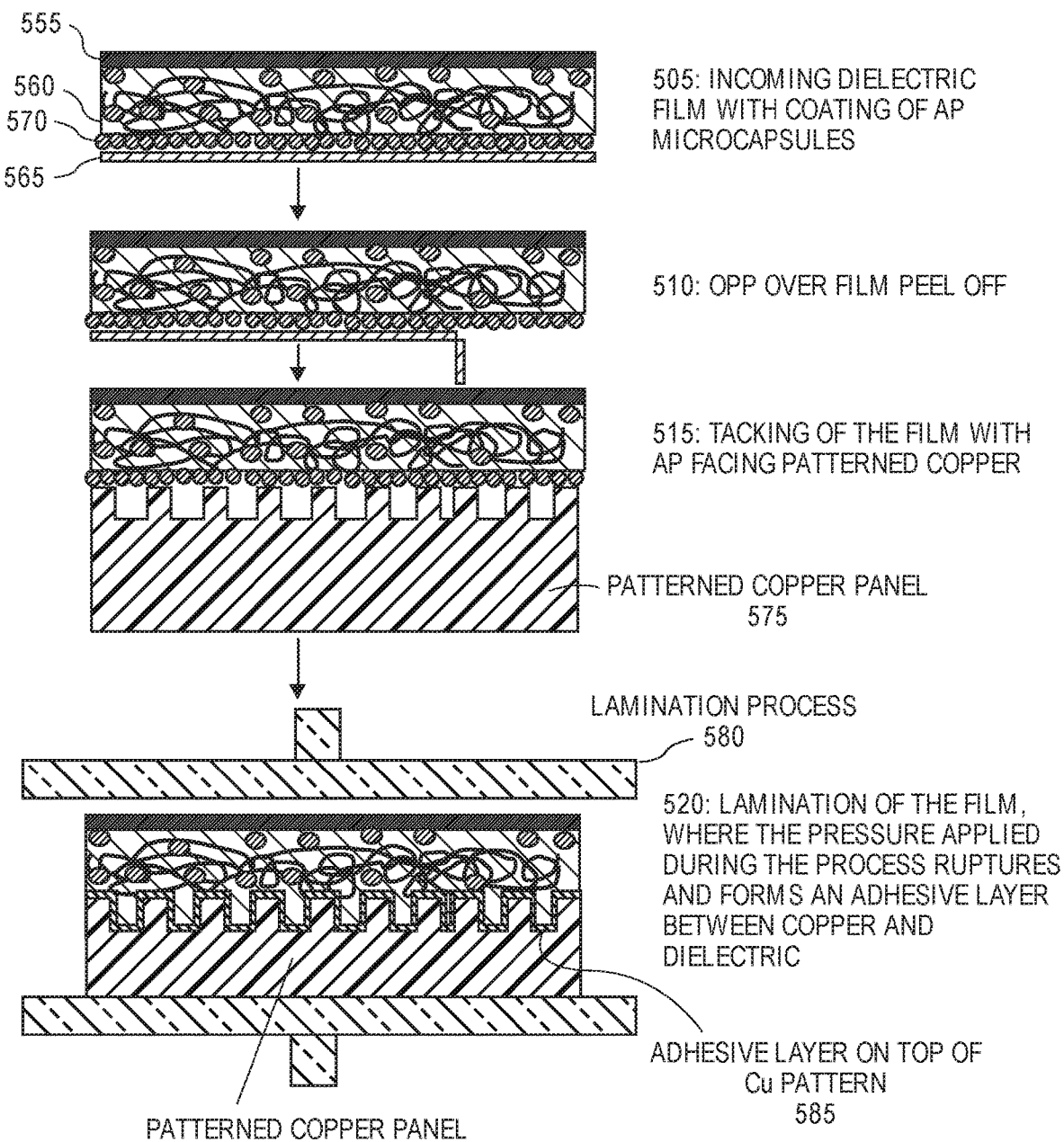
FIG. 5 is an illustration of a process for laminating a dielectric film having a coating of microencapsulated adhesion promoter according to an embodiment.

215: Lamination of dielectric film with microencapsulated adhesion promoter coating, wherein pressure sensitive microcapsules rupture during the lamination process and thus release the adhesion promoter that is contained within the microcapsules. In some embodiments, the film coated with the microcapsules of adhesion promoters may be laminated as illustrated in FIG. 5.

220: Dielectric/resin pre cure, wherein after lamination the resin or other dielectric material is pre-cured in an oven to prevent severe smear of the dielectric during VIA (Vertical Interconnect Access) formation.

225: PET layer (such as the PET film 155 illustrated in FIG. 1) peel, thus exposing the resin or other dielectric material within the dielectric film.

230: Via or other opening formation. As indicated in FIG. 2, a laser is used in conventional VIA formation for buildup layers, and, for solder resist, VIAs/openings may be photodefined.

235: Roughening of the exposed dielectric layer.

240: Metrology measurement for the VIA critical dimensions.

245: Continue with loop of processes for further copper patterning and further dielectric layers as required.

Figure 3:
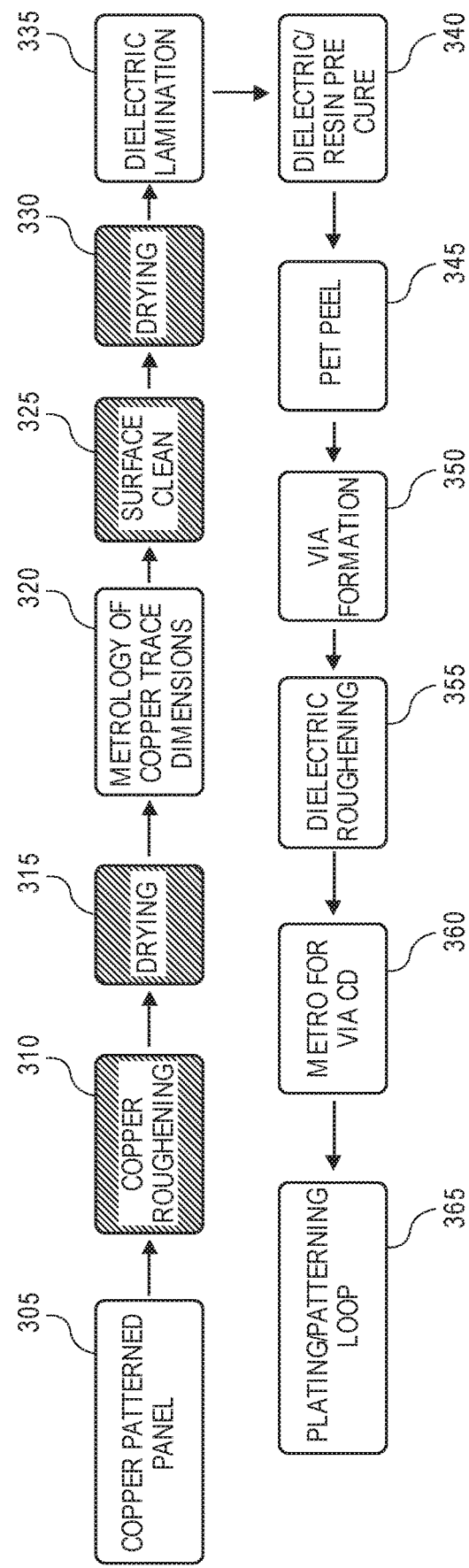
FIG. 3 illustrates a process for fabrication of an apparatus or system including conventional chemical roughening of the copper surface.

FIG. 3 illustrates a process for fabrication of an apparatus or system including conventional chemical roughening of the copper surface. The process may include the following:

305: Patterning of copper for panel.

310: Chemical roughening of copper surface.

315: Drying as required following the chemical roughening process.

320: Metrology of the copper trace dimensions.

325: Surface cleaning to remove any excess material following the copper roughening process.

330: Drying as required following the surface cleaning process.

335: Lamination of dielectric film.

340: Dielectric/resin pre cure.

345: PET layer peel, exposing the resin or other dielectric material within the dielectric film.

350: Via or other opening formation.

355: Roughening of the exposed dielectric layer.

360: Metrology measurement for the VIA critical dimensions.

365: Continue with loop of processes for further copper patterning and further dielectric layers as required.

Figure 4:
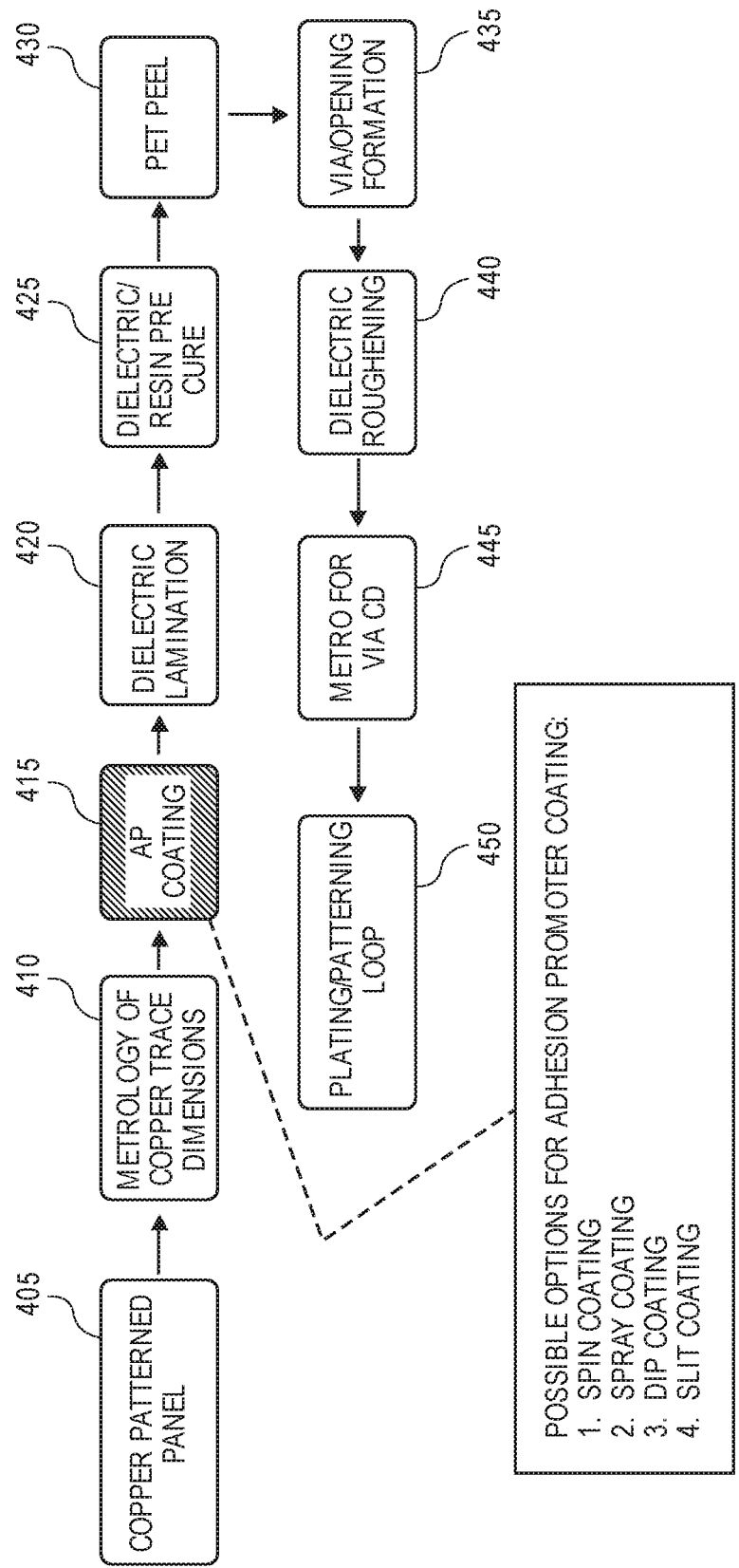
FIG. 4 illustrates a process for fabrication of an apparatus or system including application of external adhesion promoter according to an embodiment.

FIG. 4 illustrates a process for fabrication of an apparatus or system including application of external adhesion promoter according to an embodiment. In some embodiments, a process includes:

405: Patterning of copper for panel.

410: Metrology of the copper trace dimensions.

415: Application of adhesion promoter coating. Options for the external application of the adhesion promoter coating including spin coating; spray coating; dip coating; and slit coating. However, such application processes may require care to minimize unwanted diffusing of the adhesion promoter.

420: Lamination of dielectric film.

425: Dielectric/resin pre cure.

430: PET layer peel, exposing the resin or other dielectric material within the dielectric film.

435: Via or other opening formation.

440: Roughening of the exposed dielectric layer.

445: Metrology measurement for the VIA critical dimensions.

450: Continue with loop of processes for further copper patterning and further dielectric layers as required.

As shown in FIGS. 2, 3, and 4, the process for substrate packaging flow utilizing dielectric film with microencapsulated AP illustrated in FIG. 2 is shorter and simpler in comparison with the conventional process utilizing chemical roughening of patterned copper illustrated in FIG. 3, or the process flow for external application of adhesion promoter illustrated in FIG. 4.

FIG. 5 is an illustration of a process for laminating a dielectric film having a coating of microencapsulated adhesion promoter according to an embodiment. In some embodiments, the process includes the following:

505: An incoming dielectric film includes a coating with pressure sensitive microcapsules of adhesion promoter. In particular implementation, the dielectric film may include, but is not limited to, a film similar to the film 150 illustrated in FIG. 1, the film including the dielectric film including PET film 555, resin system including silica fillers 560, OPP cover film 565, and a coating of microcapsules contains adhesion promoter. In other implementation, the dielectric film may include other forms of dielectric material, such as build up dielectric solder resist dielectric, mold based dielectric, or prepreg dielectric.

510: The OPP cover film is separated or peeled in the same manner as a conventional lamination process, resulting in the exposure of the AP microcapsules.

515: The dielectric film is tacked with the AP capsules facing the patterned copper panel 575.

520: Lamination of the dielectric film using a conventional lamination press 580, wherein the pressure applied during the process, which may be a normal lamination pressure, is sufficient to rupture the pressure sensitive microcapsules and form an adhesive layer 585 between the patterned copper and the dielectric film. As the film is laminated at a pressure that is at least as great as the design pressure for the microcapsules, the pressure causes the microcapsules to rupture and release the adhesion promoters. This adhesion promoter then forms a bond with copper and dielectric material.

In some embodiments, adhesion promoters may include any known compound that provides for promotion of adhesion with the relevant materials, such as the adhesion to copper and the adhesion to dielectric material. Adhesion promoter compounds may include, but are not limited to, compounds based on functional groups such as azole (including triazole, benzotriazole, tetrazole, benzotriazole 5-carboxylic acid), azine (including triazine, tetrazine), amine (including dopamine and other related compounds), or thiol. These functional groups chelate with copper, forming a Cu based complex coordinate compound that helps form a bond between Cu and polymer resin or other dielectric material, and thereby improving the adhesion.

Microencapsulation of adhesion promoter in an embodiment is not limited to particular encapsulation methods and material, and may include any known process for generating microcapsules. Established techniques for microencapsulation include in-situ/interfacial polymerization, -aminoplast microencapsulation, coacervation, and others.

Typical shell/microcapsule wall materials used in in-situ polymerization are melamine formaldehyde, urea formaldehyde polymers and aminoplasts including polyamine moieties, polyols and substituted methylene moieties and also Ketimine-epoxy resins, etc. The risk of residual formaldehyde may be addressed using certain scavenging agents such as urea and ammonia.

Figure 6:
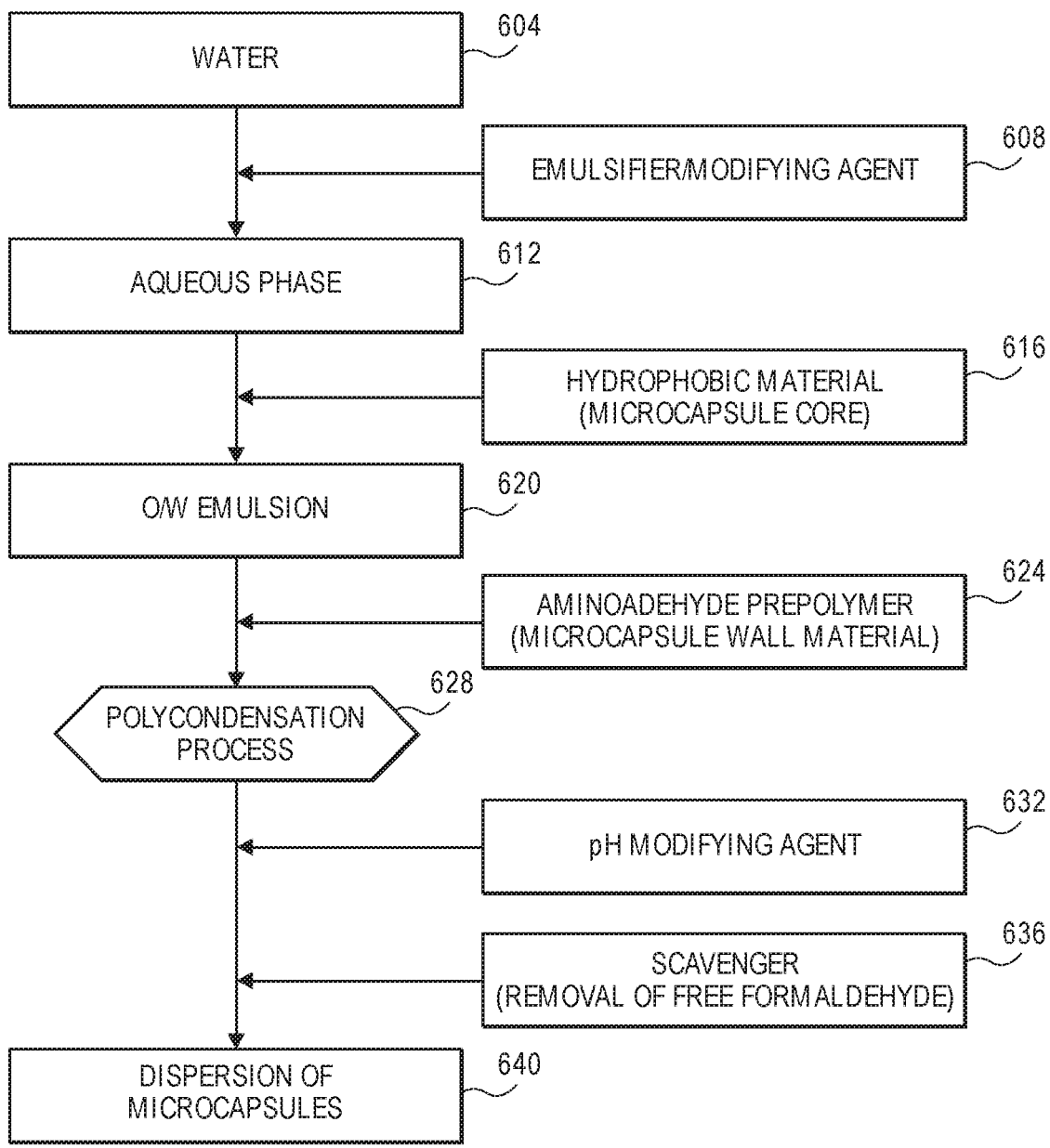
FIG. 6 illustrates a general process flow for in-situ polymerization for microencapsulation of adhesion promoter.

In an example, FIG. 6 illustrates a general process flow for in-situ polymerization for microencapsulation of adhesion promoter. A process for microencapsulation of AP may include, but is not limited to, the processes illustrated in FIG. 6, including beginning with water base 604; adding an emulsifier or modifying agent 608; proceeding to the aqueous phase 612; adding a hydrophobic material to form the microcapsule core 616; proceeding to O/W (oil in water) emulsion 620; addition of Aminoaldehyde Prepolymer to form microcapsule wall material 624; proceeding to a polycondensation process 628; addition of a pH modifying agent 632 followed by a scavenger agent to remove free formaldehyde 636; and resulting in dispersion of the microcapsules.

Coacervation is another established technique of microencapsulating materials. A coacervation encapsulation process takes place in a colloidal system (for example gelatin-gum Arabic microcapsule walls) where the macromolecular colloid rich coacervate droplets surround the dispersed to-be-microencapsulated core material to form a viscous microcapsule wall, which then is hardened/solidified by cross linking agents. Specific materials such as benzotriazoles, triazoles, tetrazoles and other have been microencapsulated by this technique where the methyl cellulose forms as microcapsule wall with azoles as the core material.

In some embodiments, an alternative implementation may include dry film with photo resist. In fabrication of devices, there are instances in which there is very little space for dry film resist (DFR) between traces or other elements. In some embodiments, the use of micro-cap adhesion may be applied to assist in maintaining the integrity of the DFR. In this manner, the microencapsulation of adhesion promoter may be applied in in patterning using photo resist.

In an embodiment applied to dry film resist, the adhesion promoter may vary in composition. The application is similar for copper adhesion, but choice of adhesion promoter may require a different material to promote adhesion of the DFR, as opposed to the dielectric material.

Figure 7:
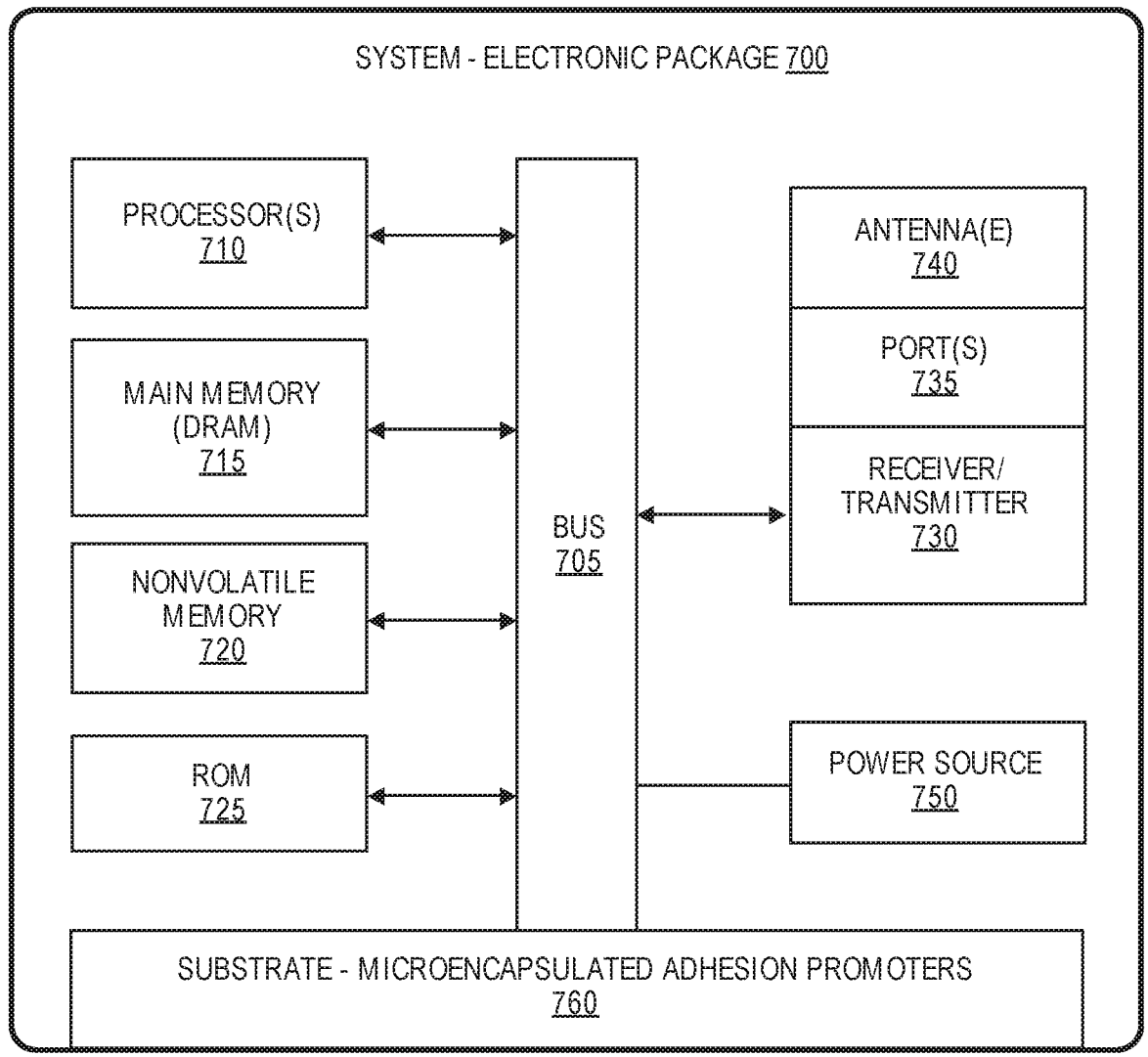
FIG. 7 is an illustration of a system including application of microencapsulated adhesion promoter according to an embodiment.

FIG. 7 is an illustration of a system including application of microencapsulated adhesion promoter according to an embodiment. In this illustration, certain standard and well-known components that are not germane to the present description are not shown. Elements shown as separate elements may be combined, including, for example, a system on package combining multiple elements within a single electronic package.

In some embodiments, an electronic package or other system 700 includes a substrate 760, wherein the substrate 760 includes one or more layers in which microencapsulated adhesion promoters are applied. In a certain embodiment, the microencapsulated adhesion promoters are contained in a dielectric film 150 such as illustrated in FIG. 1. In a certain embodiment, the microencapsulated adhesion promoters are applied as illustrated in FIG. 5.

In some embodiments, the system 700 may include a processing means such as one or more processors 710 coupled to one or more buses or interconnects, shown in general as bus 705. The processors 710 may comprise one or more physical processors and one or more logical processors. In some embodiments, the processors 710 may include one or more general-purpose processors or special-processor processors.

The bus 705 is a communication means for transmission of data. The bus 705 is illustrated as a single bus for simplicity, but may represent multiple different interconnects or buses and the component connections to such interconnects or buses may vary. The bus 705 shown in FIG. 7 is an abstraction that represents any one or more separate physical buses, point-to-point connections, or both connected by appropriate bridges, adapters, or controllers.

In some embodiments, the system 700 further comprises a random access memory (RAM) or other dynamic storage device or element as a main memory 715 for storing information and instructions to be executed by the processors 710. Main memory 715 may include, but is not limited to, dynamic random access memory (DRAM).

The system 700 may further comprise a non-volatile memory 720, such as flash memory; and a read only memory (ROM) 725 or other static storage device for storing static information and instructions for the processors 710.

In some embodiments, the system 700 includes one or more transmitters or receivers 730 coupled to the bus 705. In some embodiments, the system 700 may include one or more antennae 740, such as dipole or monopole antennae, for the transmission and reception of data via wireless communication using a wireless transmitter, receiver, or both, and one or more ports 735 for the transmission and reception of data via wired communications. Wireless communication includes, but is not limited to, Wi-Fi, Bluetooth™, near field communication, and other wireless communication standards.

The system 700 may also comprise a battery or other power source 750, which may include a solar cell, a fuel cell, a charged capacitor, near field inductive coupling, or other system or device for providing or generating power in the system 700. The power provided by the power source 750 may be distributed as required to elements of the system 700.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus includes a dielectric film, the dielectric film including a dielectric material layer, a layer of pressure sensitive microcapsules on a first side of the dielectric material layer, the microcapsules including an adhesion promoter, and a cover material on the layer of microcapsules. In some embodiments, the pressure sensitive microcapsules are to rupture upon application of a certain rupture force for the microcapsules.

In some embodiments, the rupture pressure for the microcapsules is no greater than a pressure applied in lamination of the dielectric film.

In some embodiments, the apparatus further includes a PET layer on a second, opposite side of the dielectric material layer.

In some embodiments, the adhesion promoter includes a material to promote adhesion of copper. In some embodiments, the adhesion promoter material further includes a material to promote adhesion of the dielectric material layer. In some embodiments, the adhesion promoter material includes one or more of an azole, an azine, an amine, or a thiol.

In some embodiments, the microcapsules include one of in-situ polymerization or coacervation.

In some embodiments, a method for fabrication of a substrate includes plating a panel with copper; patterning the copper on the panel; and laminating a dielectric film to the patterned copper, the dielectric film including a coating of pressure sensitive microcapsules containing an adhesion promoter on a first side of the dielectric film. In some embodiments, laminating the dielectric film includes laminating the first side of the dielectric film to the patterned copper, and wherein the laminating includes application of a force equal or greater than a rupture pressure for the microcapsules.

In some embodiments, application of the force results in release of the adhesion promoter and formation of an adhesive layer between the copper and the dielectric film.

In some embodiments, the dielectric film further includes a cover layer on the coating of microcapsules, and further comprising peeling off of the cover layer prior to laminating the dielectric film to the patterned copper.

In some embodiments, laminating a dielectric film to the patterned copper includes laminating without providing for chemical or physical roughening of a surface of the copper. In some embodiments, the adhesion promoter includes a material to promote adhesion of copper.

In some embodiments, the adhesion promoter further includes a material to promote adhesion of the dielectric film.

In some embodiments, the adhesion promoter includes one or more of an azole, an azine, an amine, or a thiol.

In some embodiments, the microcapsules include one of in-situ polymerization or coacervation.

In some embodiments, the dielectric material layer includes one or more of a resin, build up dielectric, solder resist dielectric, mold based dielectric, or prepreg dielectric.

In some embodiments, a microcapsule has a maximum size of 100 µm.

In some embodiments, an electronic package includes a substrate, the substrate including a first layer, the first layer including patterned copper, a second layer, the second layer including a dielectric film, a first side of the second layer being laminated to the first layer, and an adhesive layer between the patterned copper and the dielectric film, wherein the adhesive layer is formed in lamination by rupture of microcapsules containing adhesion promoter in a coating on the first side of the dielectric film; and one or more electronic components coupled to the electronic package.

In some embodiments, a rupture pressure for the microcapsules is no greater than a force applied in lamination of the dielectric film with the patterned copper.

In some embodiments, the adhesion promoter includes a material to promote adhesion of copper.

In some embodiments, the adhesion promoter further includes a material to promote adhesion of the dielectric film.

In some embodiments, the substrate further includes a third layer, the third layer including patterned copper; a fourth layer, the fourth layer including a dielectric film, a first side of the fourth layer being laminated to the third layer; and a second adhesive layer between the patterned copper of the third layer and the dielectric film of the fourth layer, wherein the adhesive layer is formed in lamination by rupture of microcapsules containing adhesion promoter in a coating on the first side of the dielectric film.

What is claimed is:

1. An apparatus comprising:
 a dielectric film, the dielectric film including:
  a dielectric material layer, a layer of pressure sensitive microcapsules on a first side of the dielectric material layer, the microcapsules including an adhesion promoter, and a cover material on the layer of microcapsules; wherein the pressure sensitive microcapsules are to rupture upon application of a certain rupture pressure for the microcapsules, wherein the dielectric material layer includes one or more of a resin, a build up dielectric, a solder resist dielectric, a mold based dielectric, or a prepreg dielectric.

2. The apparatus of claim 1, wherein the rupture pressure for the microcapsules is no greater than a lamination pressure applied in lamination of the dielectric film.

3. The apparatus of claim 1, further comprising a PET layer on a second, opposite side of the dielectric material layer.

4. The apparatus of claim 1, wherein the adhesion promoter includes a material to promote adhesion of copper.

5. The apparatus of claim 4, wherein the adhesion promoter material further includes a material to promote adhesion of the dielectric material layer.

6. The apparatus of claim 4, wherein the adhesion promoter material includes one or more of an azole, an azine, an amine, or a thiol.

7. The apparatus of claim 1, wherein the microcapsules include one of in-situ polymerization or coacervation.

8. The apparatus of claim 1, wherein a microcapsule of the layer of pressure sensitive microcapsules has a maximum size of 100 µm (micrometers).

9. An apparatus comprising:
 a dielectric film, the dielectric film including:
  a dielectric material layer, a layer of pressure sensitive microcapsules on a first side of the dielectric material layer, the microcapsules including an adhesion promoter, and a cover material on the layer of microcapsules; wherein the pressure sensitive microcapsules are to rupture upon application of a certain rupture pressure for the microcapsules, and a PET layer on a second, opposite side of the dielectric material layer.

10. An apparatus comprising:
 a dielectric film, the dielectric film including:
  a dielectric material layer, a layer of pressure sensitive microcapsules on a first side of the dielectric material layer, the microcapsules including an adhesion promoter, and a cover material on the layer of microcapsules; wherein the pressure sensitive microcapsules are to rupture upon application of a certain rupture pressure for the microcapsules, wherein the adhesion promoter includes a material to promote adhesion of copper, and wherein the adhesion promoter material includes one or more of an azole, an azine, an amine, or a thiol.

11. An apparatus comprising:
 a dielectric film, the dielectric film including:
 a dielectric material layer, a layer of pressure sensitive microcapsules on a first side of the dielectric material layer, the microcapsules including an adhesion promoter, and a cover material on the layer of microcapsules; wherein the pressure sensitive microcapsules are to rupture upon application of a certain rupture pressure for the microcapsules, wherein the microcapsules include one of in-situ polymerization or coacervation.

12. An apparatus comprising:
 a dielectric film, the dielectric film including:
  a dielectric material layer, a layer of pressure sensitive microcapsules on a first side of the dielectric material layer, the microcapsules including an adhesion promoter, and a cover material on the layer of microcapsules; wherein the pressure sensitive microcapsules are to rupture upon application of a certain rupture pressure for the microcapsules, wherein a microcapsule of the layer of pressure sensitive microcapsules has a maximum size of 100 µm (micrometers).

* * * * *